Figure 1:
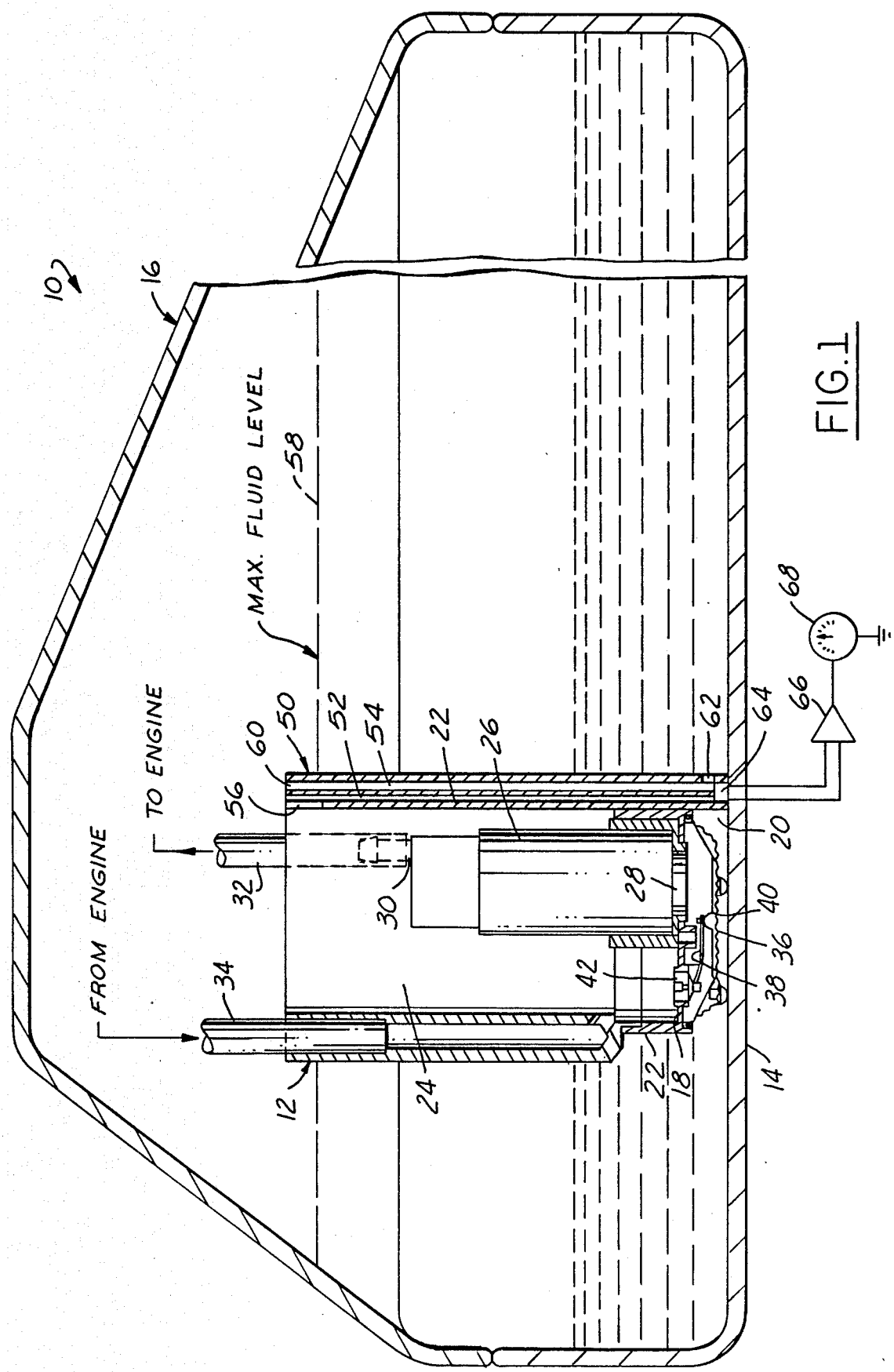

United States Patent [19]

Asselin

[11] Patent Number: 4,928,657
[45] Date of Patent: May 29, 1990

[54] IN-TANK FUEL RESERVOIR WITH FUEL LEVEL SENSOR

[75] Inventor: Brian K. Asselin, Caro, Mich.

[73] Assignee: Walbro Corporation, Cass City, Mich.

[21] Appl. No.: 318,126

[22] Filed: Mar. 2, 1989

[51] Int. Cl.⁵ .............................................. F02M 39/00
[52] U.S. Cl. .................................... 123/514; 123/509; 123/497; 137/576; 73/299
[58] Field of Search ............... 123/514, 509, 497, 499; 137/576; 73/299, 300, 301

[56] References Cited

U.S. PATENT DOCUMENTS

| | | | |
|---|---|---|---|
| 1,674,124 | 6/1928 | Redmond | 123/499 |
| 3,538,746 | 11/1970 | Jacobs | 73/299 |
| 4,639,738 | 1/1987 | Young | 73/301 |
| 4,669,309 | 6/1987 | Cornelius | 73/299 |
| 4,672,937 | 6/1987 | Fales | 123/509 |
| 4,747,388 | 5/1988 | Tuckey | 123/514 |
| 4,791,814 | 12/1988 | Nee | 73/299 |

FOREIGN PATENT DOCUMENTS

| | | | |
|---|---|---|---|
| 2607560 | 9/1977 | Fed. Rep. of Germany | 123/509 |
| 2844053 | 4/1980 | Fed. Rep. of Germany | 123/509 |
| 0306271 | 12/1988 | Japan | 123/499 |

Primary Examiner—Carl Stuart Miller
Attorney, Agent, or Firm—Barnes, Kisselle, Raisch, Choate, Whittemore & Hulbert

[57] ABSTRACT

A fuel delivery system for automotive engine and like applications comprises a canister for positioning within a fuel tank so as to be surrounded by fuel in the tank. An electric-motor fuel pump has an inlet and an outlet for feeding fuel under pressure from the tank to the engine. Excess fuel is returned from the engine to the canister. A fuel level sensor includes a pressure sensor positioned at a lower portion of the canister and responsive to head pressure within the canister and within the surrounding tank for providing an electrical signal as a function of a difference between such pressures. An indicator is responsive to such electrical signal for displaying tank fuel level to an operator.

13 Claims, 2 Drawing Sheets

IN-TANK FUEL RESERVOIR WITH FUEL LEVEL SENSOR

The present invention is directed to fuel delivery systems for automotive engine and like applications, and more particularly to a fuel pump module that includes an electric-motor fuel pump mounted within an in-tank reservoir.

U.S. Pat. No. 4,747,388 discloses a fuel delivery system for automotive vehicles that includes a canister positioned within a fuel tank and which contains an electric-motor fuel pump. The canister has an open end positioned at the bottom of the fuel tank, and an internal wall spaced from the open end to define separate upper and lower fuel canister chambers. The fuel pump is positioned in the upper chamber, has an inlet coupled to the lower chamber for drawing fuel therefrom, and and outlet for feeding fuel under pressure to an engine or the like. A pressure regulator valve bypasses excess fuel that is returned to the upper canister chamber, which thus forms a fuel reservoir surrounding the pump. A filter diaphragm spans the open lower end of the canister and is characterized by permitting free flow of liquid fuel therethrough, while being closed by surface tension of liquid fuel to restrict passage of air. The diaphragm is coupled by a lever to a valve in the canister wall. In the absence of fuel at the canister end, the diaphragm is drawn into the lower chamber by fuel pump suction and opens the valve, so that fuel is made available to the pump inlet from the upper chamber reservoir.

Although the fuel delivery system so disclosed has enjoyed substantial acceptance and success, improvements remain desirable. In particular, the fuel level sensor employed with such systems comprises a float arm coupled to a variable resistor mounted externally of the canister wall. Such float-type fuel level sensors tend to be non-linear and otherwise inaccurate. Further, one of the designed criteria of the fuel module is ease of insertion and assembly into a fuel tank at the time of automotive manufacture. However, the protruding float arm makes such insertion difficult. The float arm is also prone to damage at the manufacturing stage, which will affect accuracy throughout the sensor's operating life. One object of the present invention, therefore, is to provide a fuel delivery system that includes a fuel module of the described character having an improved fuel level sensor that is characterized by ease of insertion at the manufacturing stage, that exhibits enhanced accuracy and reliability over an extended operating lifetime, and that compares favorably in terms of manufacturing economy with conventional float-type sensors. Another object of the present invention is to provide a fuel delivery system having a fuel level sensor that embodies state-of-the-art solid state technology. Yet another object of the invention is to provide a fuel delivery system having a fuel level sensor that is readily adaptable for either analog or digital indication of fuel level to a vehicle operator.

A fuel delivery system for automotive engine and like applications in accordance with a presently preferred embodiment of the invention comprises an electric-motor fuel pump that has an inlet and an outlet for feeding fuel under pressure from a tank to the engine. Excess fuel is returned from the engine to the tank. A fuel level sensor includes a pressure sensor positioned at a lower portion of the tank and responsive to head pressure within the surrounding tank for providing an electrical signal as a function of such pressure. An indicator is responsive to such electrical signal for displaying tank fuel level to an operator.

In the preferred embodiment of the invention, the level sensor includes a reference fluid column having an upper end for receiving return fuel from the engine and thereby maintaining a fuel level within the reference column above the maximum design fuel level of the surrounding tank. A measurement column is positioned adjacent to the reference column. The measurement column has an open upper end and an orifice at the lower end for receiving fuel from the surrounding tank, so that fuel level within the measurement column follows the fuel level within the tank but is isolated from transient variations due to cornering, etc. The fuel pump is preferably disposed in a canister that is positioned in the tank so as to be surrounded by fuel in the tank. Excess fuel is returned from the engine to the canister. The respective columns are formed by vertical tubes integral with the canister sidewall, and the pressure sensor comprises a solid state differential pressure sensor mounted to the canister sidewall at the lower ends of the respective tubes.

Figure 2:
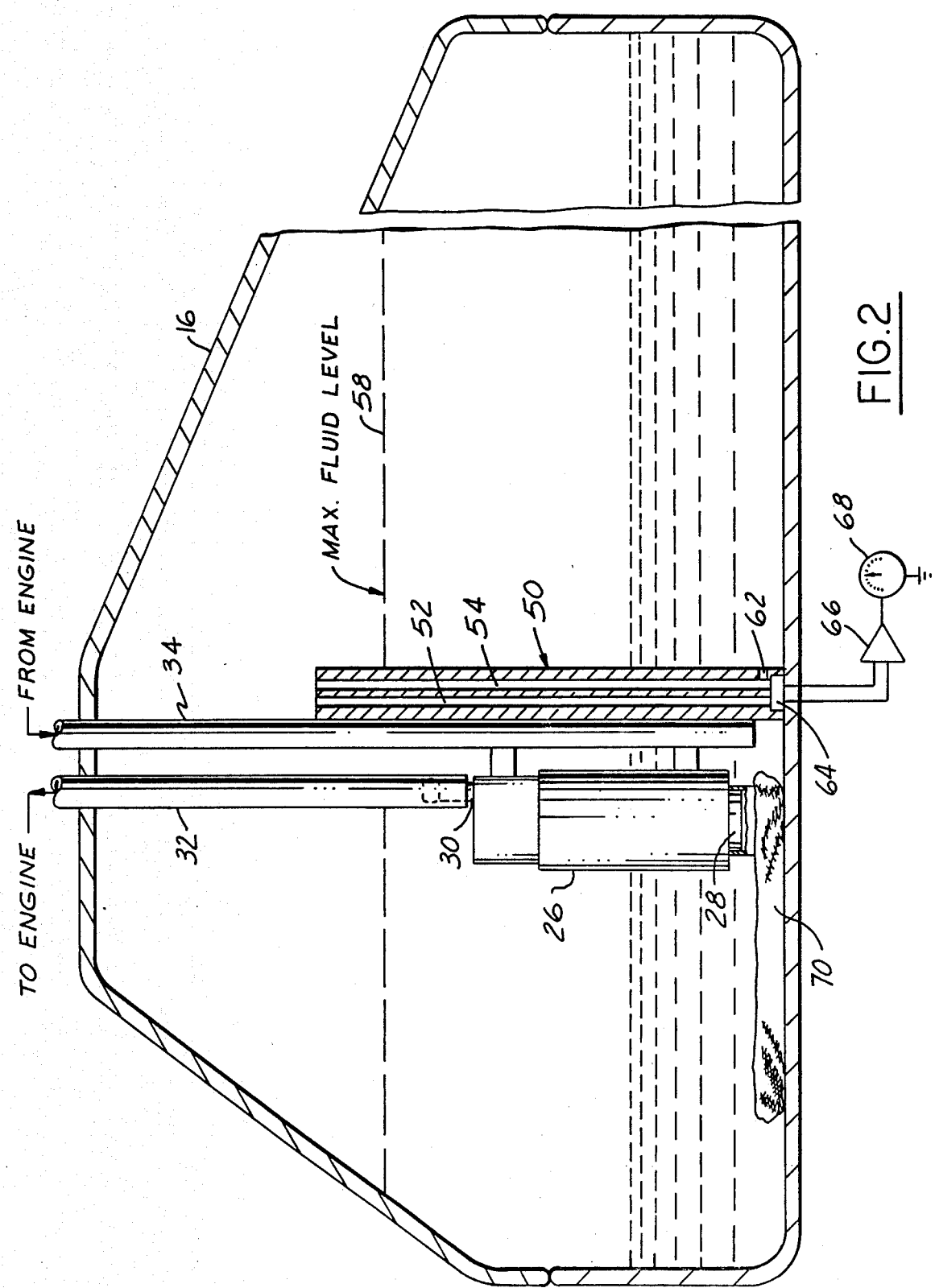

The invention, together with additional objects, features and advantages thereof, will be best understood from the following description, the appended claim and the accompanying drawings in which:

FIG. 1 is a sectional view in side elevation illustrating a fuel delivery system with fuel level sensor in accordance with a presently preferred embodiment of the invention; and FIG. 2 is a sectional view similar to that of FIG. 1 and showing a modified embodiment of the invention.

FIG. 1 illustrates a fuel delivery module 10 in accordance with a presently preferred embodiment of the invention as comprising a substantially cylindrical canister 12 having an open top and bottom. The canister is supported by and rests upon the bottom 14 of a fuel tank 16. An internal wall 18 within canister 12 forms and separates a lower chamber 20 at the open bottom of canister 12 from an upper chamber 24. Fuel is admitted to lower chamber 20 from the surrounding fuel tank. An electric-motor fuel pump 26 is positioned within upper chamber 24. Pump 26 has an inlet 28 that extends through wall 18 to draw fuel from lower chamber 20 and an outlet 30 connected by a suitable fuel line 32 for delivering fuel to an engine (not shown). Excess fuel from the engine is returned through a line 34 to upper canister chamber 24.

A mesh filter 36 spans the open lower end of canister 12, being ultrasonically welded around its periphery to an annular shoulder on canister sidewall 22. A lever 38 has a central portion pivotally mounted to wall 18 within lower chamber 20 and is coupled at one end to a web 40 centrally carried by filter 36. The opposing end of lever 38 is coupled to a valve element 42 positioned within an opening or passage in wall 18. Filter 36 is characterized by permitting free passage of liquid fuel therethrough, while being closed by surface tension of liquid fuel to restrict passage of air. Thus, in the event of absence of fuel available in chamber 20 from the surrounding tank 16, suction pressure of pump 26 pulls filter 36 upwardly, with lever 38 thus moving valve 42 downwardly and thereby permitting flow of fuel from reservoir chamber 24 into lower chamber 22 and thence to pump inlet 28. On the other hand, as long as fuel is available within lower chamber 20 from the surrounding tank, valve element 44 is urged to the closed position illustrated in the drawing. To the extent thus far described, fuel module 10 is essentially similar to that disclosed in U.S. Pat. No. 4,747,388, the disclosure of which is incorporated herein by reference for purposes of background.

In accordance with the present invention, a fuel level sensor 50 is mounted on sidewall 22 of canister 12 for indicating fuel level in tank 16 to a vehicle operator. More specifically, sensor 50 comprises a pair of parallel tubes or columns 52, 54 formed integrally with canister 12 and oriented along sidewall 22 so as to extend essentially vertically in normal orientation of canister 12 and tank 16. Column 52 is adjacent to reservoir chamber 24 of canister 12, and communicates therewith through a passage 56 at the upper end of canister sidewall 22 at a level at or above the maximum design level 58 of fuel within tank 16. Column 54 is positioned adjacent to column 52, having an opened upper end 60 above maximum fuel level 58, and having an orifice 62 at the lower end adjacent to tank bottom 14 for admitting fuel from the surrounding tank. The level of fuel in column 54 thus follows the level within the surrounding tank, while limited flow through orifice 62 helps isolate the level within column 54 from transient variations due to turns, sudden stops, etc.

A pressure sensor 64 is affixed to canister 12 so as to close the lower ends of columns 52, 54. Pressure sensor 64 is responsive to head pressure of fuel within columns 52, 54 to supply corresponding electrical signals to an amplifier 66. The output of amplifier 66 is connected to a gauge 68, which may be mounted on the vehicle dashboard for indicating fuel level to an operator. Preferably, sensor 64 comprises a differential pressure sensor of silicon or other suitable solid state construction. It will be appreciated, of course, that analog amplifier 66 and gauge 68 may be readily replaced by suitable microprocessor-based or other digital circuitry and indicators.

In operation, the level of fluid within column 52 is maintained at or above maximum fuel level 58 by reason of overflow from canister reservoir chamber 24 of return fuel from the engine. Column 52 thus establishes a stable reference head pressure. On the other hand, as previously noted, level of fuel within column 54 follows fuel level in the surrounding tank, so that the output of sensor 64 to amplifier 66 varies as a function of the difference between the reference and measurement head pressures, thereby providing at gauge 68 an accurate indication of actual fuel level within tank 16.

FIG. 2 illustrates a modified embodiment of the invention in which level sensor 50 is free standing within tank 16 rather than affixed to the sidewall of a canister (FIG. 1). A portion of the return fuel in line 34 is fed directly to reference column 52, while the remainder is fed to the volume of tank 16. Pump 26 is supported by columns 52, 54 and draws fuel through a filter sock 70. Otherwise, the embodiment of FIG. 2 is identical to that of FIG. 1 hereinabove described in detail.

The invention claimed is:

1. A fuel delivery system for automotive engine and like applications comprising: an electric-motor fuel pump for positioning within a fuel tank and having an inlet and an outlet for feeding fuel under pressure to an engine, the tank having a maximum design fuel level, means for returning excess fuel from the engine to the tank, and means for sensing fuel level within the tank, characterized that said level-sensing means comprises:

means positioned at a lower portion of the tank responsive to fuel head pressure within the surrounding tank for providing an electrical signal as a function thereof, and means responsive to said electrical signal for indicating fuel level in the tank, said level-sensing means comprising reference head pressure means, including a reference column for holding fuel and means for feeding fuel returned from the engine to said reference column for maintaining fuel level in said reference column above said maximum design fuel level, said pressure-responsive means being responsive to fuel head pressure in said reference column in comparison to head pressure in the tank.

2. The system as set forth in claim 1 wherein said level-sensing means further comprises a measurement column and means for feeding fuel from the tank to said measurement column such that fuel level in said measurement column follows fuel level in the tank.

3. The system as set forth in claim 2 wherein said reference and measurement columns comprise respective tubes integrally and adjacently formed.

4. The system as set forth in claim 3 wherein said means for feeding fuel to said reference column comprises a passage at or above said maximum design fuel level coupling said reference column to said excess-fuel-returning means.

5. The system as set forth in claim 4 wherein said means for feeding fuel to said measurement column comprises an open top on said measurement column tube at or above said maximum design fuel level and an orifice at a lower end of said measurement column tube.

6. The system as set forth in claim 5 wherein said pressure-responsive means comprises a differential pressure sensor.

7. The system as set forth in claim 6 wherein said fuel pump is positioned within a canister, with said inlet being positioned to draw fuel from said canister.

8. The system as set forth in claim 7 wherein said tubes are integral with a sidewall of said canister.

9. The system as set forth in claim 8 wherein said canister has a lower end with an opening and an internal wall spaced from said lower end dividing said canister with upper and lower chambers, said pump inlet being coupled through said internal wall to said lower chamber, and means for selectively feeding fuel from said upper chamber to said lower chamber.

10. A fuel delivery system for automotive engine and like applications comprising: a canister for positioning within a fuel tank so as to be surrounded by fuel in the tank, an electic-motor fuel pump having an inlet and an outlet for feeding fuel under pressure to an engine, means for returning excess fuel from the engine to said canister, and means for sensing fuel level within the tank, characterized that said level-sensing means comprises:

means positioned at a lower portion of said canister responsive to fuel head pressures within said canister and the surrounding tank for providing an electrical signal as a function of a difference therebetween, and means responsive to said electrical signal for indicating fuel level in the tank.

11. The system as set forth in claim 10 wherein the tank has a maximum design fuel level, and wherein said level-sensing means comprises reference head pressure means in said canister, including a reference column for holding fuel and means for feeding fuel returned from the engine to said reference column for maintaining fuel level in said reference column above said maximum design fuel level, said pressure-responsive means being responsive to fuel head pressure in said reference column in comparision to head pressure in the tank.

12. The system as set forth in claim 11 wherein said refererence and measurement columns comprise respective tubes integrally and adjacently formed in a sidewall of said canister 13. The system as set forth in claim 12 wherein said means for feeding fuel to said reference column comprises a passage in said sidewall at or above said maximum design fuel level coupling said reference column to the internal volume of said canister.

* * * * *